Patented May 5, 1936

2,039,739

UNITED STATES PATENT OFFICE 2,039,739

PRODUCTION OF A LECITHIN NUTRIENT MATERIAL

Bruno Albert Rewald, Hamburg, Germany, assignor, by mesne assignments, to American Lecithin Company, Cleveland, Ohio, a corporation of Ohio No Drawing. Application October 25, 1933, Serial No. 695,213. In Germany November 26, 1932

1 Claim. (Cl. 99—15)

The invention concerns the production of a lecithin nutrient material.

The usual commercial lecithin, which has an oil content of 30 to 70% is not susceptible to cutting and moulding by means of the usual machines. Still less is pure lecithin suitable for these operations, particularly the lecithin obtained from vegetable sources, such as soya bean and the like, since pure lecithin cannot be obtained in a stable form.

It has now been found that a lecithin nutrient material which is susceptible to cutting and moulding can be obtained if, for example, vegetable phosphatides are brought into intimate admixture with pulverulent or gritty or similar materials. Preferably use is made of those materials which are themselves nutrients, such as sugar and the like. The phosphatide may be oil-containing, or may be utilized freed from its associated oil. Also the oil component can be replaced by an extraneous oil or fat such for example as cocoa butter and so forth.

According to the invention the vegetable phosphatide to be used is, for example, worked by rolling on a roll mechanism preferably in the warmed condition, and the product so obtained is prior to or after the addition of the pulverulent solid material, worked, or more especially beaten, in a suitable device, for example in a foam beater, until the material acquires a foaming character. The operation is then preferably continued until cooling is effected and if desired with the use of a cooling device, cooled down by means of a cooling agent, in order to obtain as large a surface as possible. During the manufacture small proportions of aromatizing or flavouring materials can be added. In this way, there is obtained, in spite of the large surface, a stable, cuttable and mouldable product which no longer shows any of the disadvantages of the usual lecithins or phosphatides. It can be formed by machines, for example by a moulding press or other moulding or cutting machines to small pieces, tablets or the like. The tablets produced can, according to an advantageous embodiment, be provided with a coating, for example of chocolate material, sugar or the like, or can be converted into a coated product in a coating drum.

For example, when 10 parts of soya lecithin are mixed with 1 part of sugar and 1 part of cocoa powder, or 2 parts of cocoa powder or another similar suitable nutrient or delicacy, the condition of the lecithin, in spite of the quite small addition, is so considerably modified that it forms a material very readily worked, cut and moulded on machines since the material shows a particularly good adaptability for cutting. Moreover, advantageously, such products can be produced by making the additions during the manufacturing process in that also for example sugar is added to the aqueous emulsion. In this way the sugar is uniformly distributed throughout the whole material. On distilling off and deodorizing, the whole preparation is converted to a dry material immediately ready for use.

It has further been found that the products obtained in the above described manner according to the invention do not possess the tallowy or fatty taste of the usual commercial lecithin, or that this taste is suppressed to a great extent so that the product according to the invention is advantageously suitable for the production of lecithin preparations wherein it can be incorporated in larger quantities than is the case with common lecithin on account of the gluey character of the latter, and its property of swelling up in the mouth is practically overcome. By the addition according to the invention, moreover, the flavor of the lecithin is further improved which is entirely unexpected, since, the lecithin according to the invention has a very large surface due to the foaming and beating so that it would be expected that the lecithin flavour as a result of the great surface would be further emphasized and that the oxidizability would be increased.

This phenomenon is particularly valuable as it is well known that the usual phosphatides readily oxidize in the air.

I claim:—

Process of producing nutrient material consisting in adding sugary material to aqueous phosphatide emulsion, and distilling said mixture, the amount of said sugary material being only a very minor fraction of the amount of the phosphatide, and deodorizing said mixture to form a solid product.

BRUNO ALBERT REWALD.